United States Patent
Reeds, III et al.

(10) Patent No.: US 6,513,380 B2
(45) Date of Patent: Feb. 4, 2003

(54) MEMS SENSOR WITH SINGLE CENTRAL ANCHOR AND MOTION-LIMITING CONNECTION GEOMETRY

(75) Inventors: John William Reeds, III, San Juan Capistrano, CA (US); Ying Wen Hsu, Huntington Beach, CA (US); Phu Cu Dao, Arcadia, CA (US)

(73) Assignee: Microsensors, Inc., Costa Mesa, CA (US)

( * ) Notice: Subject to any disclaimer, the term of this patent is extended or adjusted under 35 U.S.C. 154(b) by 28 days.

(21) Appl. No.: 09/884,880

(22) Filed: Jun. 19, 2001

(65) Prior Publication Data

US 2002/0189352 A1 Dec. 19, 2002

(51) Int. Cl.$^7$ .............................................. G01C 19/00
(52) U.S. Cl. ............................ 073/504.12; 073/504.04; 073/514.29
(58) Field of Search ..................... 73/514.29, 504.02, 73/504.03, 504.04, 504.12

(56) References Cited

U.S. PATENT DOCUMENTS

| | | | | |
|---|---|---|---|---|
| 4,943,750 A | * | 7/1990 | Howe et al. | 310/309 |
| 5,894,090 A | * | 4/1999 | Tang et al. | 73/504.02 |
| 6,393,914 B1 | * | 5/2002 | Zarabadi et al. | 73/514.04 |

* cited by examiner

Primary Examiner—Richard A. Moller
(74) Attorney, Agent, or Firm—Myers Dawes & Andras; Joseph C. Andras; Vic Y. Lin (57) ABSTRACT

Disclosed is a MEMS sensor including a sense element and a single anchor that supports the sense element arranged in a central hub-like fashion that reduces the effects of thermal stress. Usually, two or more anchors are required to suitably constrain the sense element's motion. The anchor disclosed herein, however, supports the sense element with connection elements having a connection geometry that substantially limits the motion of the sense element to a single-degree-of-freedom. The connection elements may include, for example, converging flexures, an extender bar, or both.

18 Claims, 7 Drawing Sheets

MEMS SENSOR WITH SINGLE CENTRAL ANCHOR AND MOTION-LIMITING CONNECTION GEOMETRY

FIELD OF THE INVENTION

The present invention relates generally to sensors and, more particularly, to a micromachined sensor with a single anchor and motion-limiting connection geometry.

BACKGROUND OF THE RELATED ART

This invention involves MEMS (micro-electro-mechanical systems) sensors that use a vibratory or flexural element.

MEMS sensors are generally produced by micromachining silicon wafers using photolithographic techniques. The small size of these elements, typically around 1 square millimeter, enables the production of large numbers of devices from a single silicon wafer.

One typical example of a MEMS sensor is a micro-gyro. A micro-gyro measures the angular rate of rotation about an input axis or so-called "rate axis". Micro-gyros may generally be classified as linear or as rotary. In either case, a mass is driven into vibration relative to a "drive axis" that is orthogonal to the rate axis. Gyros are designed such that if the mass is subject to rotation relative to the sensor's rate axis at some angular rate of rotation, then coriolis forces will cause the vibration of a sense element relative to a "sense axis" that is orthogonal to the rate and drive axes.

The unique micro-gyros developed by the assignee of this invention and disclosed in U.S. Pat. No. 5,955,668, commonly owned by the assignee of this invention and hereby incorporated by reference in its entirety, are statically "decoupled" in that the drive mass and the sense element may move independently. In the absence of a rotational rate input, the oscillation of the drive mass about the drive axis does not induce a substantial motion in the sense element. In the presence of rotational rate, however, a coriolis-induced oscillation about the sense axis is dynamically transferred from the drive mass to the sense element through suitably designed flexures.

In the embodiments described in the '668 patent, the sense element was anchored to the substrate at two or more points. Other gyro and accelerometer designs typically use multiple anchors, including those described by U.S. Pat. Nos. 5,408,877; 5,515,724; 5,569,852; 5,574,222; 5,578,755; 5,618,989; 5,627,317; 5,631,422; 5,646,347; and 5,408,119. The use of multiple anchors effectively inhibits the sense element from oscillation about the drive axis, but residual stresses from manufacturing processes and thermal stresses due to material expansion or contraction between the anchors may affect the sensor performance. The issues of thermal and manufacturing stresses are common to all varieties of MEMS sensors, not just micro-gyros. Limiting the motion of the supported element, however, is often paramount. It would be advantageous to develop a micromachined sensor that reduces the stresses associated with multiple anchors while providing a motion-limiting connection geometry that substantially restricts the sense element to a single motion, specifically rotary or translational oscillation with respect to a sense axis; in other words, constrains the motion of the sense element to a single degree of freedom. The embodiments described in the '668 patent were an improvement to the existing art, but further embodiments have been developed which provide this additional advantage.

SUMMARY OF THE INVENTION

In a first aspect, the invention resides in an improved micro-electro-mechanical systems (MEMS) sensor having a substrate and a sense element that exhibits a motion relative to the substrate in response to an influence to be sensed, the improvement comprising: a single centrally-located anchor extending from the substrate to support the sense element; and a means for connecting the sense element to the single anchor which substantially constrains the motion of the sense element to a single degree of freedom.

In a second aspect, the invention resides in a MEMS sensor comprising: a substrate; a sense element having a central aperture, said sense element exhibiting a sense motion relative to a sense axis passing through the central aperture in response to an influence to be sensed; a single anchor extending from the substrate within the sense element's central aperture to support the sense element; and a means for connecting the sense element to the single anchor, the connecting means having a geometry that substantially constrains the motion of the sense element to a single degree of freedom corresponding to the sense motion.

In a third aspect, the invention resides in a MEMS sensor comprising: a substrate; a sense element that is located in a plane substantially parallel to the substrate, that has a central aperture, and that exhibits a motion in response to an influence to be sensed; a single anchor extending in a substantially perpendicular direction from the substrate to within the sense element's central aperture to support the sense element; and connecting elements that connect the single anchor to the sense element within the central aperture, the connecting elements having a geometry that substantially facilitates a sense motion of the sense element relative to a first sense axis passing through the central aperture and substantially inhibits other motion relative to the first sense axis and motions relative to second and third axes that are perpendicular to the first sense axis and to one another.

BRIEF DESCRIPTION OF THE DRAWINGS

The just summarized invention can be best understood with reference to the following description taken in view of the drawings of which.

DETAILED DESCRIPTION OF THE PREFERRED EMBODIMENTS

The innovation disclosed herein is applicable to various MEMS sensors including micro-gyros, accelerometers, and other sensors.

The present inventors have determined that for most MEMS sensors, a single anchor positioned as a central hub is highly preferable, because thermal stresses and residual manufacturing stresses are minimized. A means is necessary whereby the motion of the sense element attached to such a single hub may be constrained to a single degree of freedom. Any motion of the sense element relative to the drive axis can produce a sense output due to changes in the fringing effects of sense capacitors, manufacturing tolerances in surface contours or planarity, and other influences. These effects can be very significant, because the amplitude of the desired sense motion may be an order of magnitude or more below that of the drive motion, so any secondary influences caused by the drive motion may create an excessively large noise in the sense signal. A design in which the inertial mass may be driven about the drive axis without inducing a motion in the sense element in the absence of a rate input is therefore highly preferable. This innovation provides a means by which such a design is possible.

The innovation, therefore, resides in the use of a single anchor in combination with a means for connecting a sense element to that anchor, said means effectively constraining the motion of that sense element to a single degree of freedom. Various geometries are possible, but it is presently contemplated that the innovation may be implemented with "reversed" or converging flexures, with an extender bar, or with both. Both embodiments allow the element to be anchored with a single centrally located support or anchor.

In some embodiments of the invention the anchor is attached to a sense element with a plurality of flexural arrangements. Single flexures extending radially from the hub would make the sense element sensitive to rotary, torsional, and possibly lateral vibration modes. In accordance with certain embodiments of this invention, however, it is possible to substantially limit the motion of the sense element to a single degree-of-freedom by using one or more sets of at least two flexures. For each set of flexures connected to the anchor, the endpoints are spaced at around the maximum feasible distance (typically about the width of the anchor). Rather than extending radially outwards in a diverging manner, as in some prior art devices, the flexures within each set are angled together to converge with a small enclosed angle, typically around 10 degrees. The endpoints of each set of flexures are therefore closer together at the end where they are attached to the sense element than at the end where they are attached to the anchor. This provides a stiffening effect inhibiting both rotary and lateral flexure modes, substantially limiting the flexures to a torsional vibration. The rotary mode may be further inhibited by adding an "extender bar", a cantilevered platform attached directly to the anchor. If the two sets of flexures are located at opposite ends of the extender bar, the rotational mode frequency may be increased with little effect on the torsional mode.

In another preferred embodiment an extender bar is used as the central beam of an I-beam shaped structure. Flexures are arranged at the ends of the beam to complete the I-beam shape. The other ends of the four flexure arrangements are attached to the sensor element, and are used to restrict the sensor element motion to a lateral oscillation. Increasing the distance of the flexure axes from the hub will increase the rotary and torsional frequencies with little effect on the lateral oscillation mode.

First Embodiment

Figure 1:
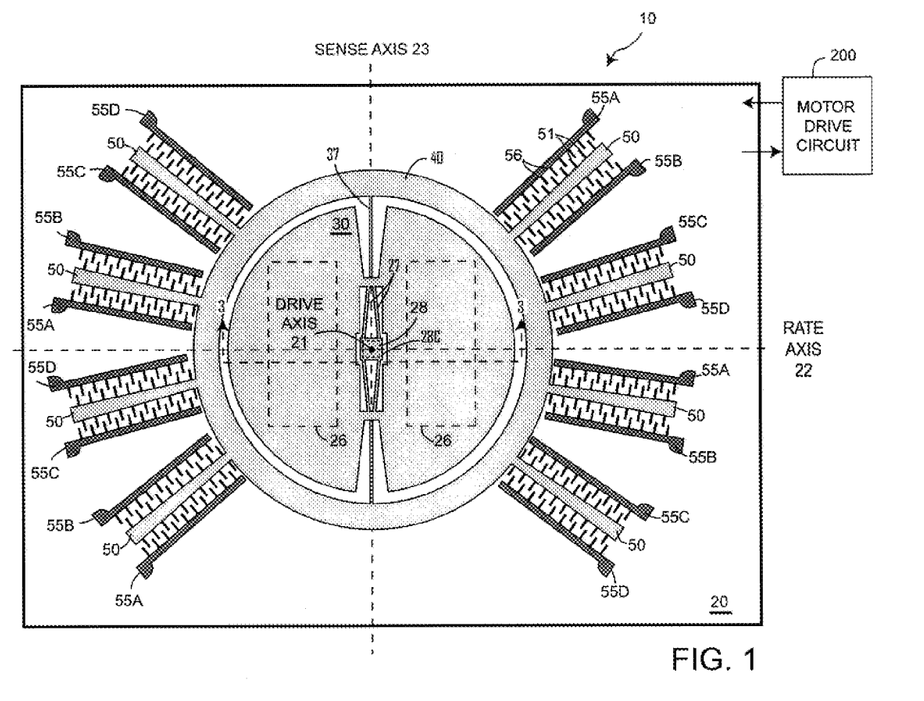
FIG. 1 is a simplified top plan view of a first exemplary MEMS sensor consisting of a micro-gyro with a single anchor and a motion-limiting connection geometry formed from converging pairs of flexures according to a first preferred embodiment of this invention.
Figure 2:
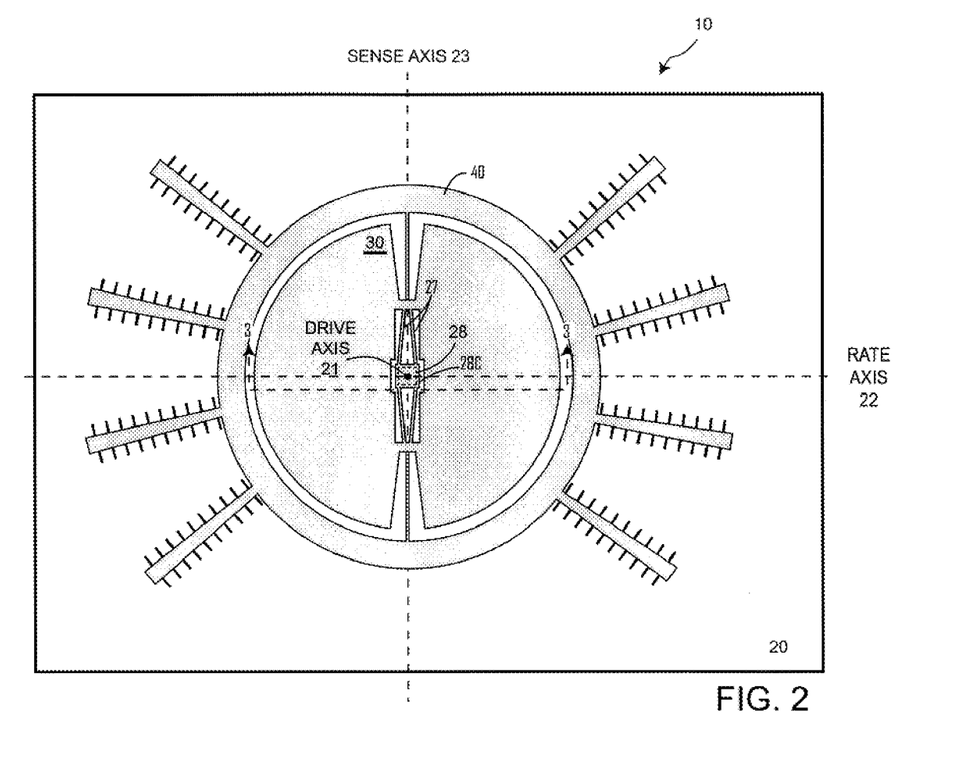
FIG. 2 is a further simplified top plan view of the first exemplary MEMS sensor of FIG. 1 wherein many of the elements have been removed to more clearly illustrate the remaining structure.

FIGS. 1 and 2 are simplified and further simplified top plan views of a first exemplary MEMS sensor 10 consisting of a micro-gyro having a sense plate 30 which rocks about a sense axis 23, and a drive ring 40 which is driven about a drive axis 21. As shown in both figures, the MEMS sensor 10 includes a single anchor 28 and a motion limiting connection geometry formed from converging pairs of flexures 27 according to a first preferred embodiment of this invention. The anchor 28 and flexures 27 are contained within a central aperture of the sense plate 30. FIG. 2 shows this structure with some of the details specific to this particular MEMS sensor removed for clarity.

A "single-point mount" must in actuality have a finite size. In this embodiment, for example, the anchor 29 is about 40 microns square. A 40 micron anchor provides sufficient rigidity to effectively inhibit all motions not permitted by the arrangement of flexures (typically 2 to 4 microns wide) connecting the sensor to the anchor 29.

Figure 3:
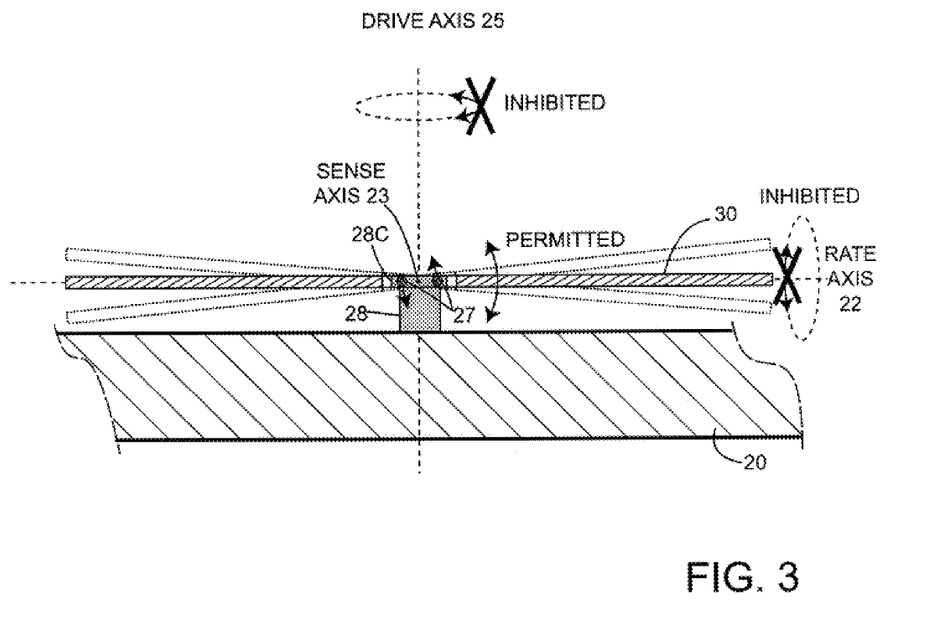
FIG. 3 is a dimensionally-exaggerated cross-sectional side view of FIG. 1 (or 2) taken along section lines 3—3.

FIG. 3 is a dimensionally-exaggerated cross-sectional side view of FIG. 1 (or 2) taken along section lines 3—3. As suggested by the various arrows, the sense plate is substantially permitted to rock about a sense axis 23, but is substantially inhibited from moving relative to a drive axis 21 or a rate axis 22.

The following more-detailed description of the micro-gyro's construction and operation is provided to enabled the reader to understand the utility of this first embodiment, but it should be understood that this is but one embodiment and that the invention may be readily applied to many varieties of MEMS sensors, including accelerometers.

Returning to FIG. 1, the MEMS sensor 10 shown is a micro-gyro 10 of substantially planar construction. In operation, it senses rotational rate about a rate axis 22 that is substantially parallel to a plane of the micro-gyro 10. The micro-gyro 10 shown, therefore, may be regarded as an x-axis or y-axis gyro.

In more detail, the micro-gyro 10 comprises a substrate 20, a single anchor 28 connected to the substrate 20, and first inner flexures 27 that are connected to the anchor 28 and extending from the anchor 28 above and substantially parallel to the plane of the micro-gyro 10. A slightly enlarged anchor cap 28C is provided in this embodiment, but flexures 27 could emanate directly from the anchor 28.

The sense plate 30 is flexibly connected to the anchor 28 via the first flexures 27. Although it is supported from a single anchor 28, the sense plate 30 is uniquely constrained to a single-degree-of-freedom rocking motion about a sense axis 23 that is substantially parallel to the plan e of the micro-gyro 10 and substantially perpendicular to the rate axis 22 because the geometry of first inner flexures 27 substantially inhibits rotation about the drive axis 25 (owing to the convergent configuration of the flexures 27) and substantially inhibits rotation about the rate axis 22 (owing to the thickness of the flexures 27 perpendicular to the plane of the substrate 20), but facilitates a rocking motion about the sense axis 23 (owing to the relative ease with which the converging flexures 27 may flex in a torsional mode as suggested by the opposing arrows in FIG. 3). The sense plate 30 interfaces with one or more sense electrodes 26 as is well known in the art.

Second outer flexures 37 are connected to the sense plate 30 and extend from the sense plate 30 above and substantially parallel to the plane of the micro-gyro 10. The second outer flexures 37 readily permit angular oscillation about the drive axis 25.

The drive ring 40 is flexibly connected to the sense plate 30 via the second flexures 37. The drive ring 40 moves about the drive axis 25 that is perpendicular to the plane of the micro-gyro and to both the rate and sense axes 22, 23. Due to the geometry of the first and second flexures 27, 37, the drive ring 40 can move about the drive axis 25 while the sense plate 30 remains substantially stationary.

Lastly, a drive means for oscillating the drive ring 40 about the drive axis 25 is provided. In the embodiment shown, the drive means comprises a plurality of driven arms 50 that extend radially outward from the drive ring 40 between a pair of drive electrodes 55A, 55B or 55C, 55D, a plurality of partially overlapping comb-fingers 51, 56 that form an electrostatic comb-drive structure, and a motor drive circuit 200 that suitably applies voltages that oscillate the ring element 40 at a desired frequency. The exact structure of the drive means is not critical to the present invention and any suitable drive means may be used.

Second Embodiment

Figure 4:
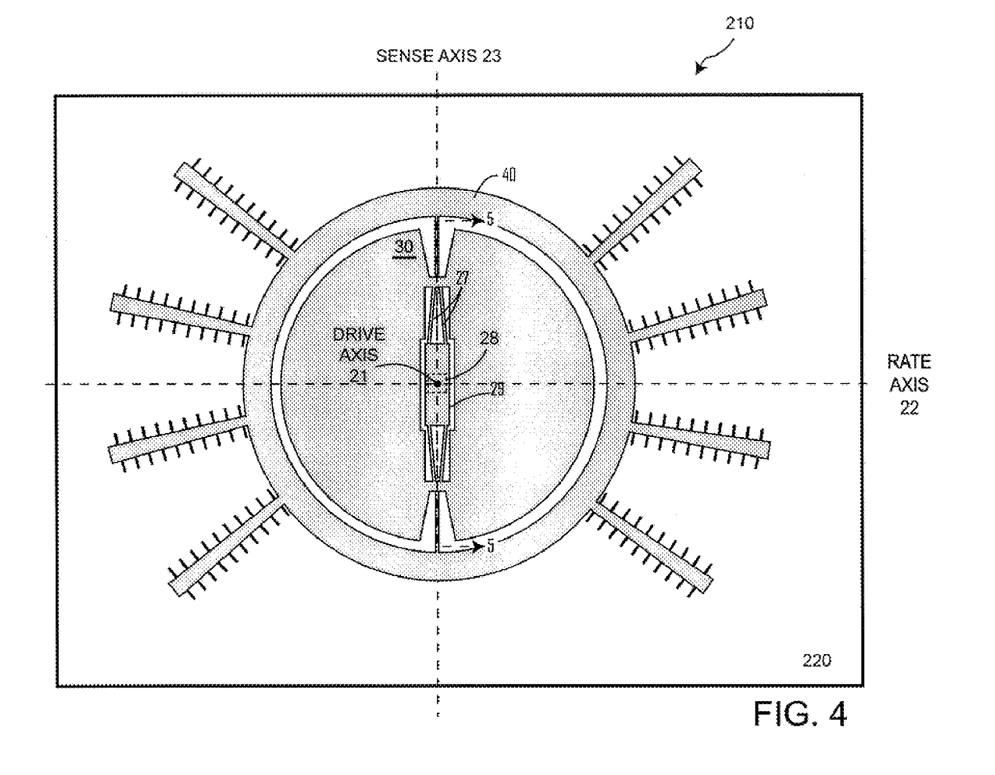
FIG. 4 is a simplified top plan view of a second exemplary MEMS sensor consisting of a micro-gyro having a single anchor and a motion limiting connection geometry that further includes an extender bar according to a second preferred embodiment of this invention.

FIG. 4 shows a second exemplary MEMS sensor 210 consisting of a micro-gyro that also has a single anchor 28 and a motion-limiting connection geometry consisting of converging flexures 27. Here, however, the MEMS sensor 210 further includes an extender bar 29 connected to and effectively extending the anchor 28 according to a second preferred embodiment of this invention.

Figure 5:
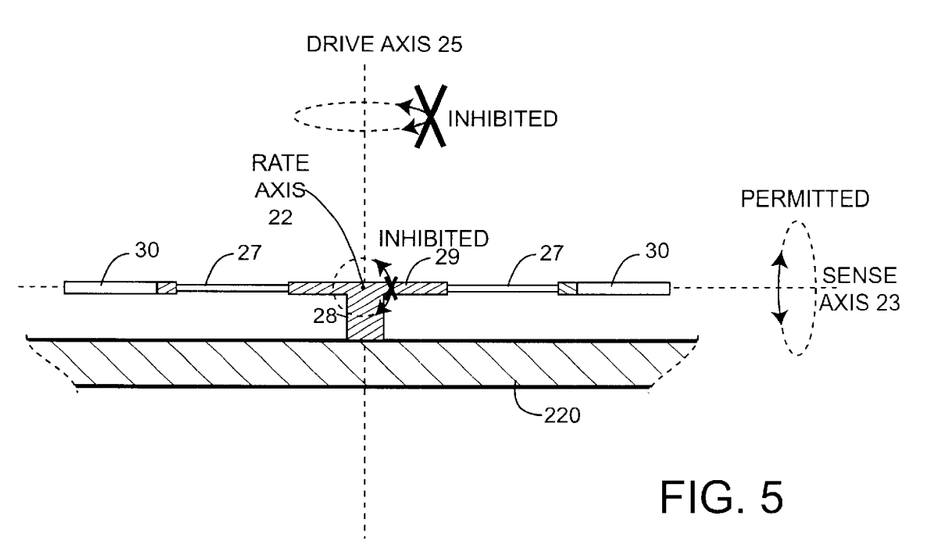
FIG. 5 is a dimensionally-exaggerated cross-sectional side view of FIG. 4 taken along section lines 5—5.

FIG. 5 is a dimensionally-exaggerated cross-sectional side view of FIG. 4 taken along section lines 5—5 that serves to illustrate the extender bar 29. As shown, the extender bar 29 is essentially a bar-shaped platform which extends symmetrically from both sides of the single anchor 28 and substantially parallel to the substrate 220. The remainder of the connection between the anchor 28 and the sense plate 30 is made with first and second pairs of flexure elements 27 that connect the extender bar to the sense element 30.

The extender bar 29 is desirable in that it tends to further inhibit rotation of the sense element about the rate axis 22 as suggested by the corresponding "X" in FIG. 5.

The extender bar 29 provides this and other benefits as follows. Each pair of flexures 27 forms a lever arm that supports some portion of the mass of the sense plate 30, the drive ring 40, and other related elements. By providing the extender bar 29, the lever arm starts farther away relative to the anchor 28 and reduces the moment of the mass acting on the flexures 27, which correspondingly inhibits the any rotation of the sense element about the rate axis 22 or the drive axis 25.

Third Embodiment

Figure 6:
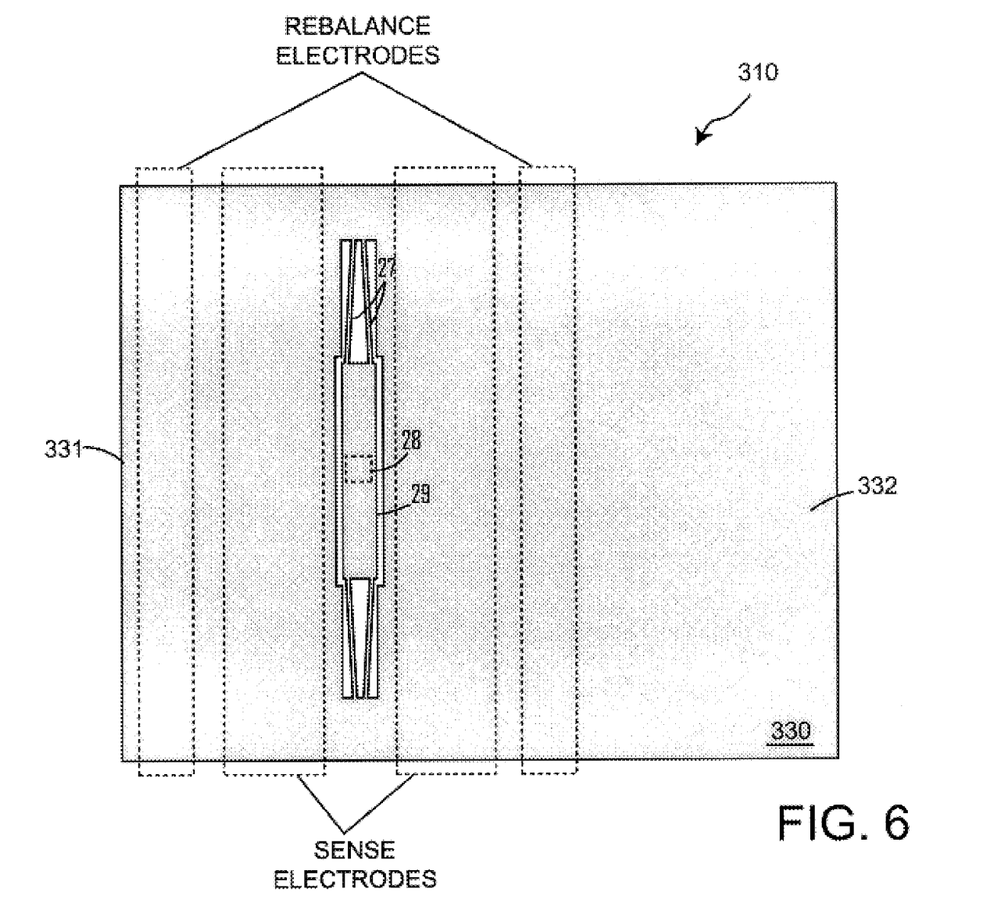
FIG. 6 is a simplified top plan view enlargement of a third exemplary MEMS sensor consisting of an accelerometer having a single anchor and a motion limiting connection geometry that includes an extender bar and converging pairs of flexures like that in the micro-gyro embodiment of FIG. 4.

FIG. 6 is a simplified top plan view enlargement of a third exemplary MEMS sensor 310 consisting of an accelerometer having a sense element 330 (with first and second asymmetric sides 331, 332 located above capacitive sense electrodes) supported from a single anchor 28 and a motion-limiting connection geometry that includes an extender bar 29 and converging pairs of flexures 27 comparable to that in the micro-gyro embodiment of FIG. 4. The extender bar and flexure geometry effectively inhibit rotation of the sense element about an axis perpendicular to the substrate as well as lateral translations. The sense element is essentially restricted to a rocking motion about a single axis.

Fourth Embodiment

Figure 7:
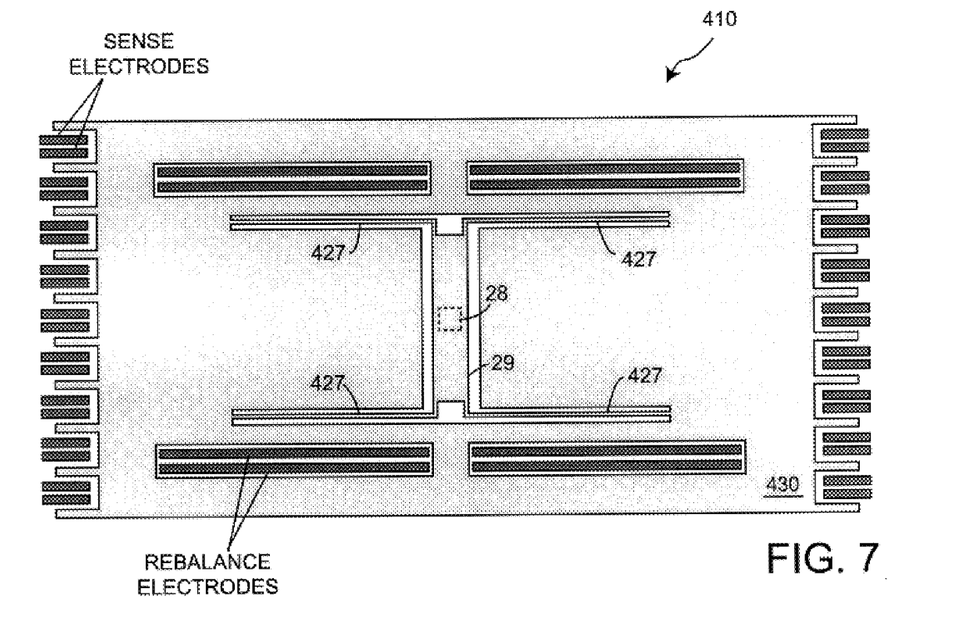
FIG. 7 is a simplified top plan view of a fourth exemplary MEMS sensor consisting of a linear accelerometer having a single anchor and a motion-limiting connection geometry comprising an extender bar.

FIG. 7 is a simplified top plan view of a fourth exemplary MEMS sensor 410 consisting of a linear accelerometer having a sense element 430 supported from a single anchor 28 and a motion limiting connection geometry comprising an extender bar 29.

Here, the extender bar 29 is used as the central beam of an I-beam shaped structure. Four flexures 427 are arranged at the ends of the extender bar 29 to complete the I-beam shape. The other ends of the four flexure arrangements 427 are attached to the sense element 430, and are used to facilitate a lateral oscillation of the sense element. Use of the extender bar 29 to increase the distance of the flexure from the anchor 28 will increase the rotary and torsional frequencies (thereby inhibiting rotary and torsional motions) with little effect on the lateral oscillation mode.

The following claims are provided as a definition of the invention incorporated into the embodiments disclosed herein. It should be understood that the preferred embodiments are just that, embodiments, and that the invention encompasses the invention as set forth in the following claims.

We claim:

1. An improved micro-electro-mechanical systems (MEMS) sensor having a substrate and a sense element that exhibits a motion relative to the substrate in response to an influence to be sensed, the improvement comprising:

a central aperture in the sense element;

a single centrally-located anchor extending from the substrate and positioned within the sense element's central aperture to support the sense element above the substrate; and a means for connecting the sense element to the single anchor and substantially constraining the motion of the sense element to a single degree of freedom.

2. The improved MEMS sensor of claim 1 wherein the sense element is substantially disk-shaped.

3. The improved MEMS sensor of claim 2 wherein the motion of the sense element is substantially constrained to a single rotary oscillation about an axis that is substantially parallel to the substrate.

4. The improved MEMS sensor of claim 1 wherein the sense element is substantially rectangular.

5. The improved MEMS sensor of claim 4 wherein the motion of the sense element is substantially constrained to a single rotary oscillation about an axis that is substantially parallel to the substrate.

6. The improved MEMS sensor of claim 4 wherein the sense element's single degree of freedom motion is a linear motion along an axis that is substantially parallel to the substrate.

7. The improved MEMS sensor of claim 1 wherein the connecting means comprises two pairs of flexure elements extending from opposite sides of the single anchor, each pair of flexure elements originating from a first pair of spaced apart positions on the single anchor that are separated from one another by a first distance, then extending and converging towards one another before connecting to the sense element.

8. The improved MEMS sensor of claim 7 wherein the flexure elements connect to the sense element at a second pair of spaced apart positions that are separated from one another by a second smaller distance.

9. The improved MEMS sensor of claim 8 wherein the sense element's central aperture has a pair of opposing inner sides, wherein the single anchor has a pair of opposing outer sides that are substantially facing the central aperture's pair of opposing inner sides, and wherein the connecting means comprises first and second pairs of flexure elements that extend from each of the single anchor's opposing outer sides in a convergent direction towards a corresponding one of the central aperture's opposing inner sides.

10. The improved MEMS sensor of claim 1 wherein the connecting means comprises:

first and second bar elements that extend substantially parallel to the substrate and to opposite sides of the single anchor; and first and second pairs of flexure elements that connect the first and second bar elements to the sense element.

11. The improved MEMS sensor of claim 10 wherein the first and second bar elements comprise a substantially rectangular member supported by the single anchor.

12. The improved MEMS sensor of claim 1 wherein the sense element comprises a plate with a central aperture and wherein the single anchor is located within the central aperture.

13. The improved MEMS sensor of claim 12 wherein the central aperture has opposed inner sides, wherein the single anchor has opposed outer sides, and wherein the connecting means comprises first and second pairs of converging flexures that extend in opposite directions from the single anchor's first and second outer sides to the central aperture's first and second inner sides.

14. The improved MEMS sensor of claim 1 wherein the influence to be sensed is angular rate.

15. The improved MEMS sensor of claim 1 wherein the influence to be sensed is acceleration.

16. The improved MEMS sensor of claim 15 wherein the influence to be sensed is linear acceleration.

17. A micro-electro-mechanical systems (MEMS) sensor comprising:

a substrate;

a sense element having a central aperture, said sense element exhibiting a sense motion relative to a sense axis passing through the central aperture in response to an influence to be sensed;

a single anchor extending from the substrate within the sense element's central aperture to support the sense element; and a means for connecting the sense element to the single anchor, the connecting means having a geometry that substantially limits the motion of the sense element to a single degree of freedom corresponding to the sense motion.

18. A micro-electro-mechanical systems (MEMS) sensor comprising:

a substrate;

a sense element having a central aperture, said sense element being in a plane substantially parallel to the substrate and exhibiting a motion in response to an influence to be sensed;

a single anchor extending substantially perpendicularly from the substrate within the sense element's central aperture to support the sense element; and connecting elements that connect the single anchor to the sense element within the central aperture, the connecting elements having a geometry that substantially facilitates motion of the sense element relative to a first sense axis passing through the central aperture and substantially inhibits other motion relative to the first sense axis and motions relative to second and third axes that are perpendicular to the first sense axis and to one another.

* * * * *